United States Patent [19]

Taylor et al.

[11] Patent Number: 5,551,704
[45] Date of Patent: Sep. 3, 1996

[54] SEAL FOR ENHANCING PIPES

[75] Inventors: John Taylor, South Godstone; Michael Hicks, Woking; Richard Lamb, Worcester Park; Robert N. Bennett, Hextable; Keith Nixon, Biggin Hill; Ian Ashcroft, Purley; Adrian S. Parkes, Burgess Hill; John P. Smith, Sevenoaks, all of United Kingdom

[73] Assignee: British Gas plc, London, England

[21] Appl. No.: 336,049

[22] Filed: Nov. 4, 1994

Related U.S. Application Data

[62] Division of Ser. No. 566,411, Oct. 23, 1990, filed as PCT/GB89/01535, Dec. 22, 1989.

[30] Foreign Application Priority Data

Dec. 23, 1988 [GB] United Kingdom ............... 8830111

[51] Int. Cl.⁶ ............................................. F16J 15/10
[52] U.S. Cl. ................................... 277/208; 277/207 A
[58] Field of Search ............................ 277/207 A, 208; 285/3, 14, 110, 177

[56] References Cited

U.S. PATENT DOCUMENTS

| | | | |
|---|---|---|---|
| 1,213,466 | 1/1917 | Delanoy | 285/3 X |
| 2,271,777 | 2/1942 | Nathan | 277/207 A |
| 2,896,974 | 7/1959 | Bush | 277/207 A |
| 3,414,273 | 12/1968 | Sumner | 277/207 AX |
| 3,779,564 | 12/1973 | Chookazian | 277/207 AX |
| 3,844,585 | 10/1974 | Sands et al. | 285/3 |
| 3,903,942 | 9/1975 | Vest | 277/207 AX |
| 4,547,005 | 10/1985 | Soederhuyzen | 285/110 X |
| 4,732,397 | 3/1988 | Gavin | 277/207 A |
| 5,106,127 | 4/1992 | Briet | 285/110 X |

FOREIGN PATENT DOCUMENTS

| | | | |
|---|---|---|---|
| 1432209 | 12/1966 | France | 277/207 A |
| 1350593 | 4/1974 | United Kingdom | 277/207 A |

Primary Examiner—William A. Cuchlinski, Jr.
Assistant Examiner—John L. Beres
Attorney, Agent, or Firm—Oblon, Spivak, McClelland, Maier & Neustadt, P.C.

[57] ABSTRACT

A method is provided for replacing an existing service pipe carrying fluid to an outlet within a property with a replacement service pipe. In the method the outlet is disconnected within the property from the existing service pipe in such a way that both during and after disconnection fluid is prevented from escaping into the property. A desired length of replacement service pipe is then fed into the existing service pipe in such a way that during and after the feeding step fluid is prevented from escaping into the property. The outlet is then connected to the outlet end of the replacement pipe in such a way that during the connection fluid is prevented from escaping into the property and after the connection step fluid is allowed to pass to the outlet solely by way of the replacement pipe.

9 Claims, 14 Drawing Sheets

FIG. 8
FIG. 9
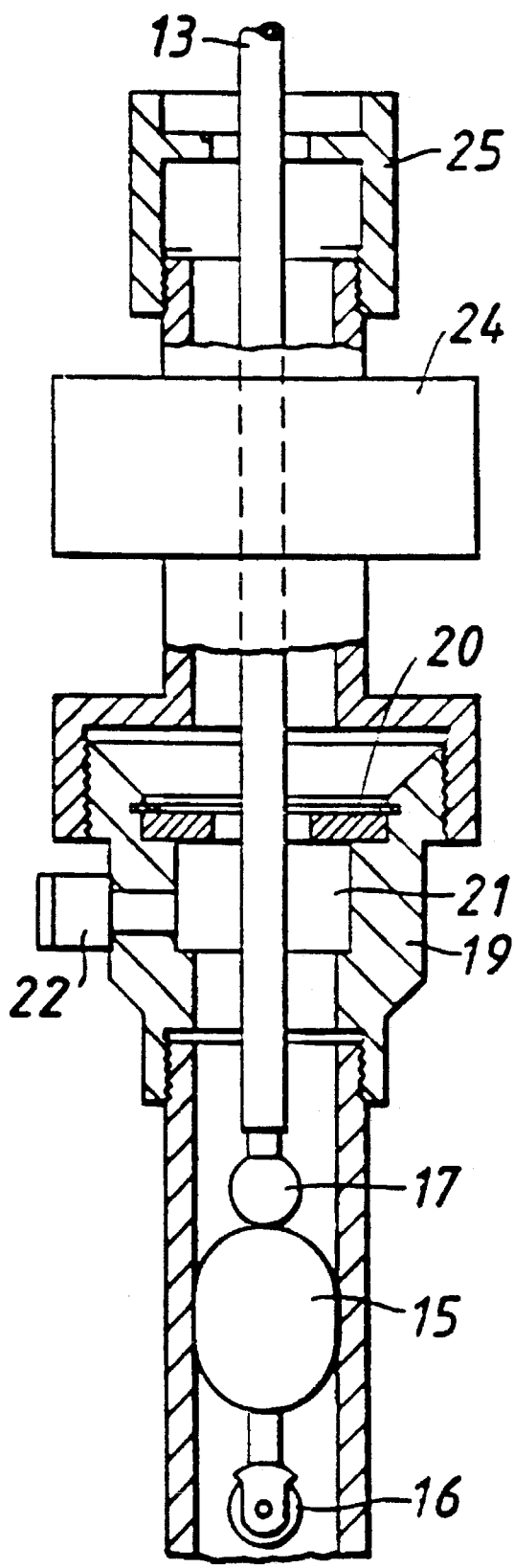
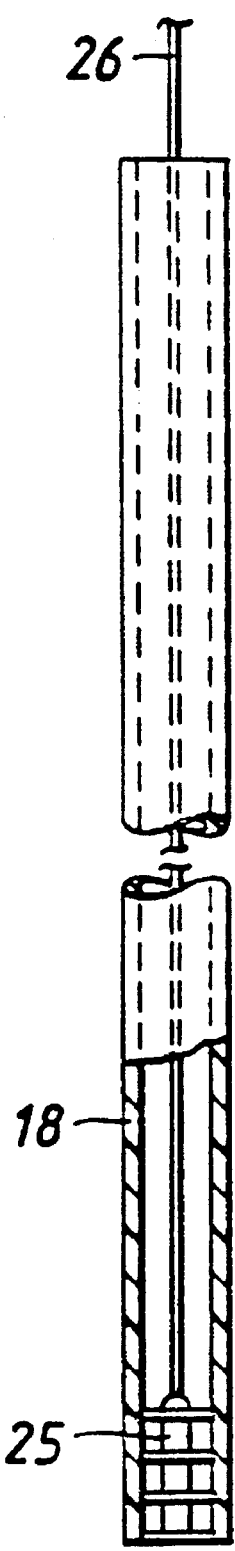

FIG.10
FIG.11
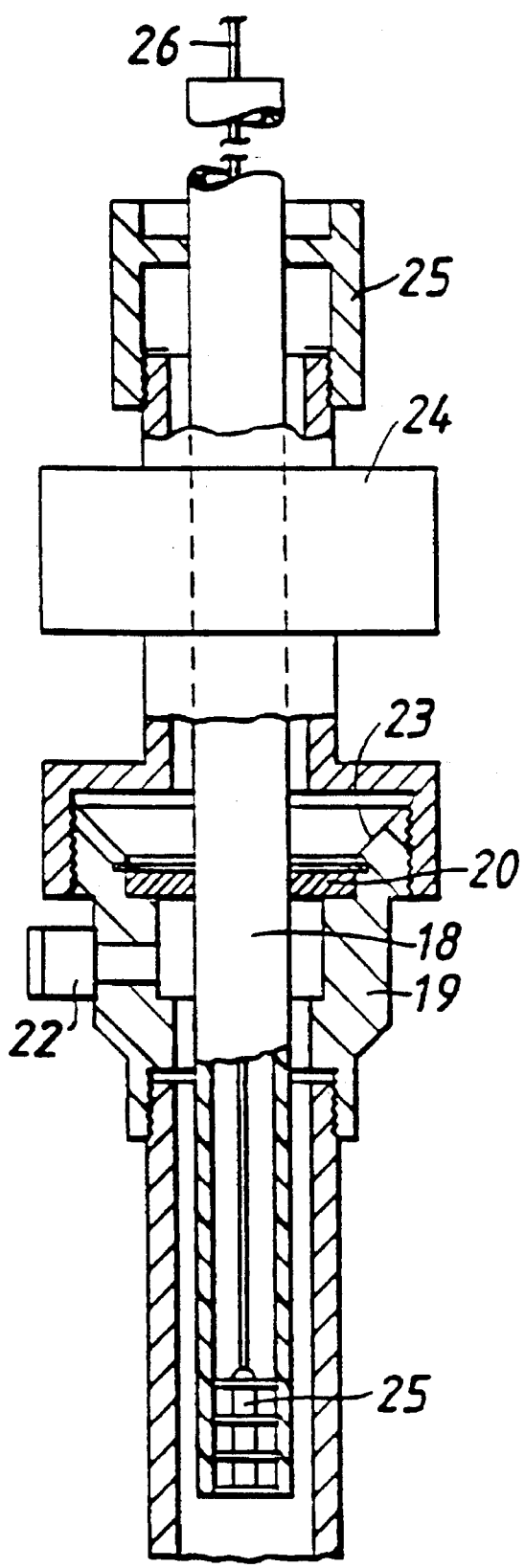
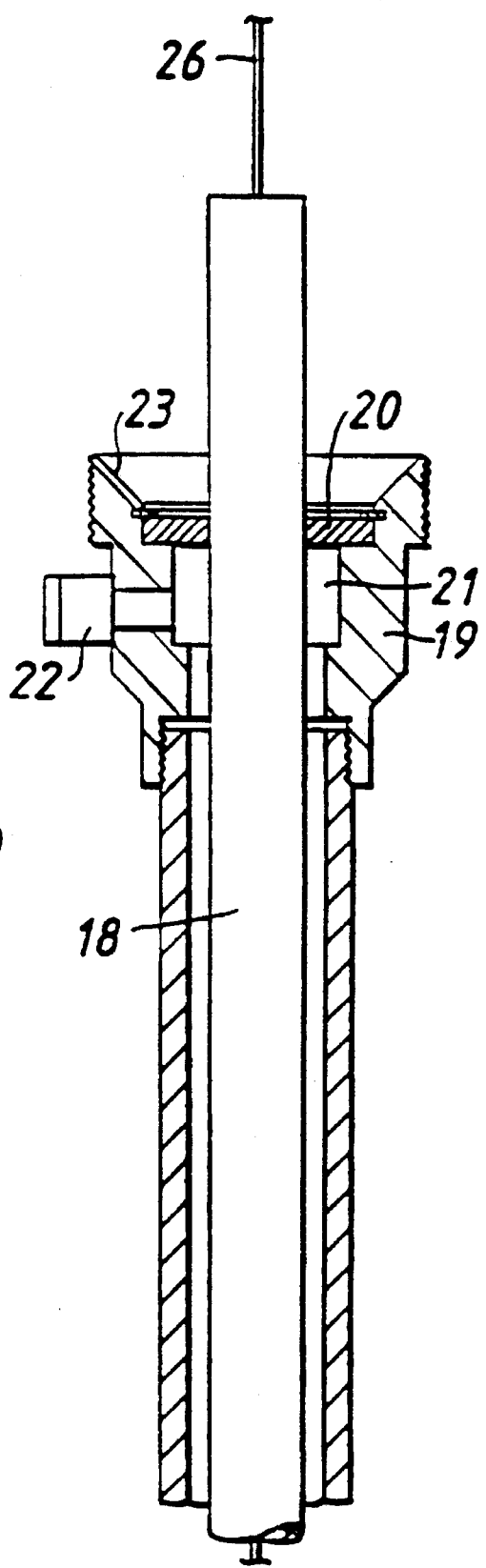

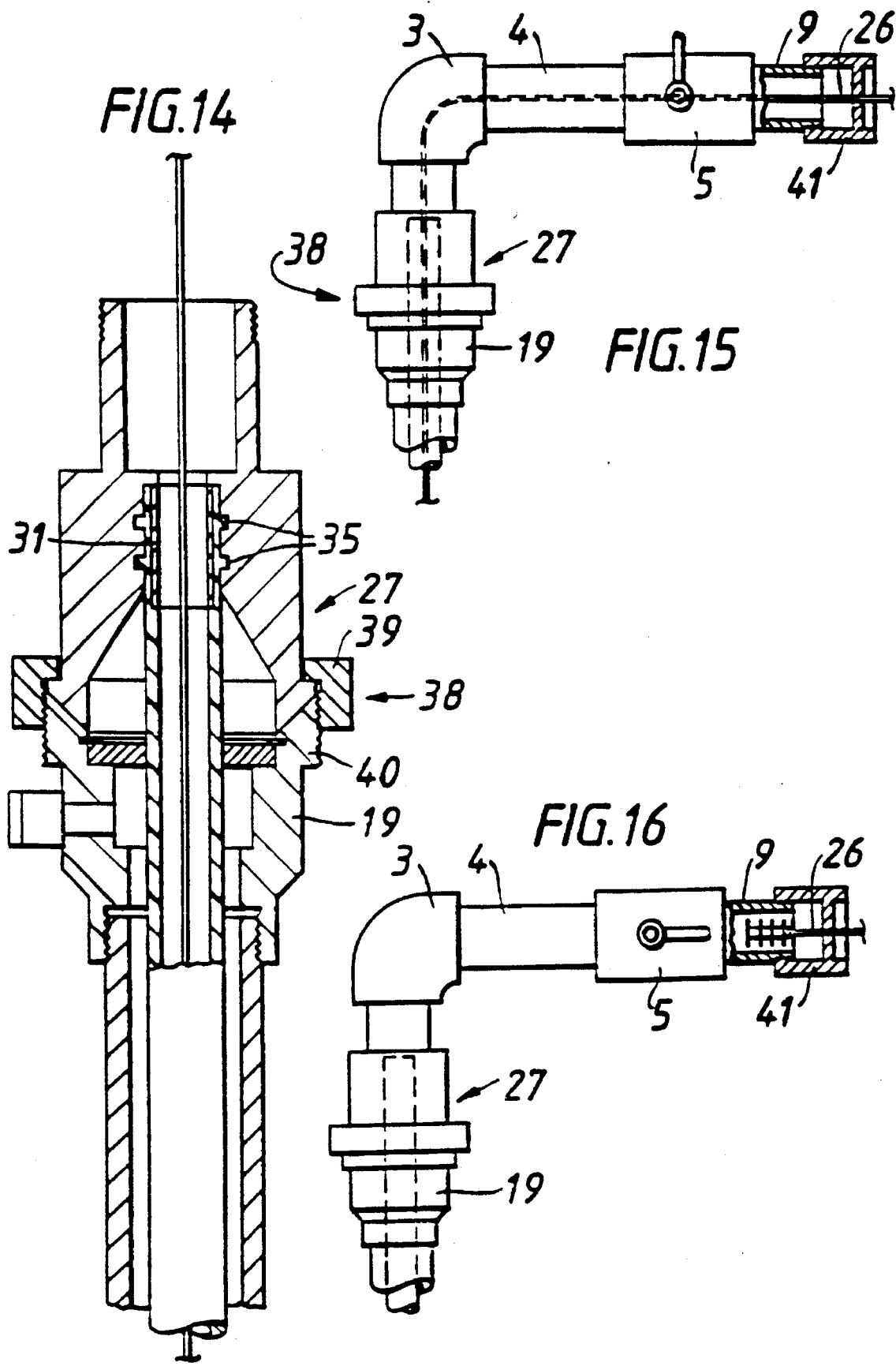

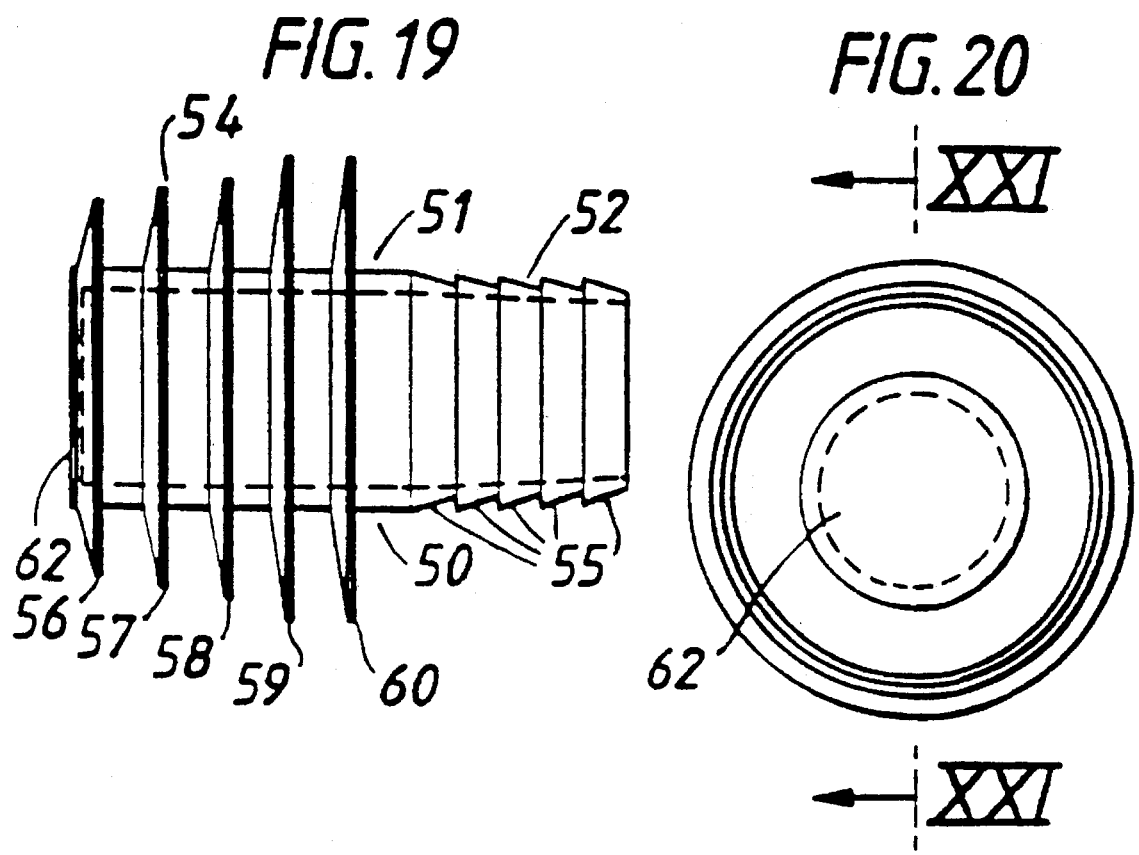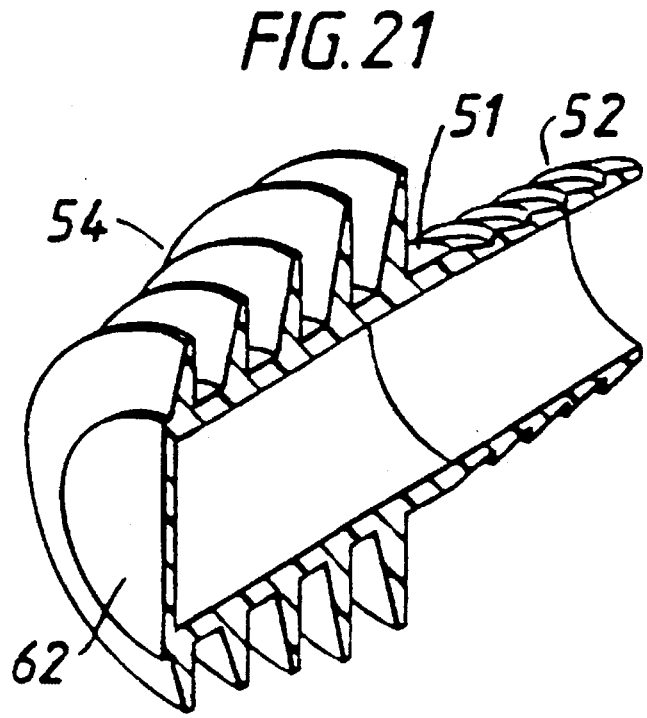

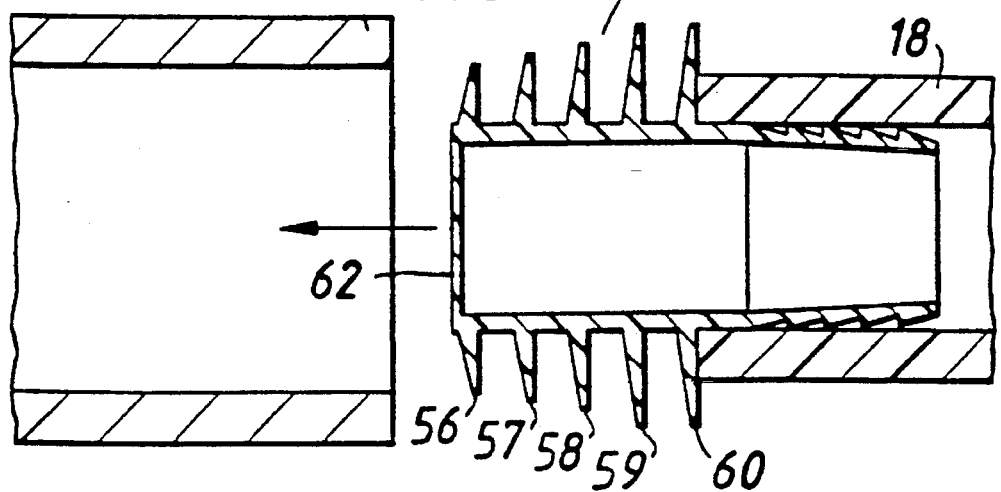
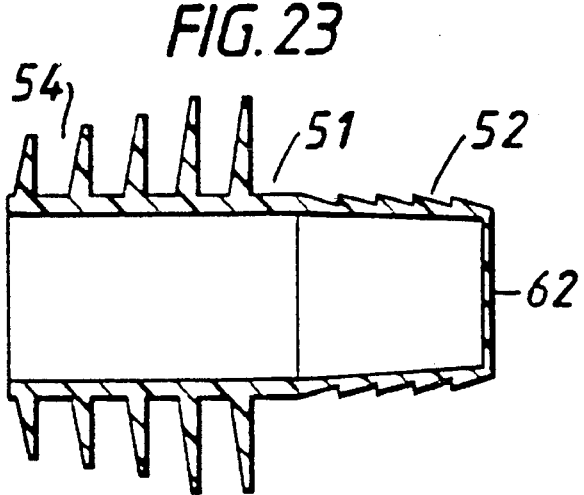
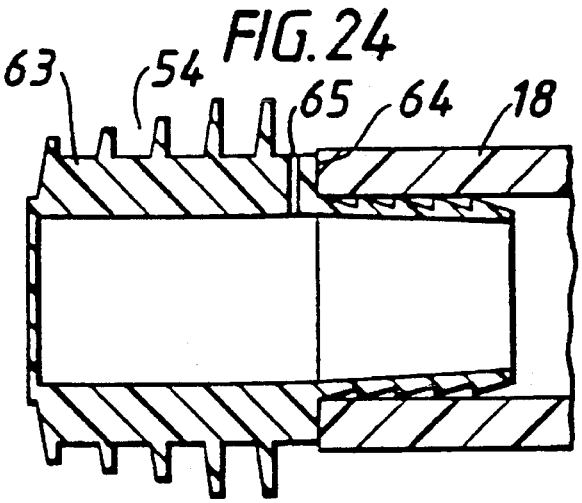

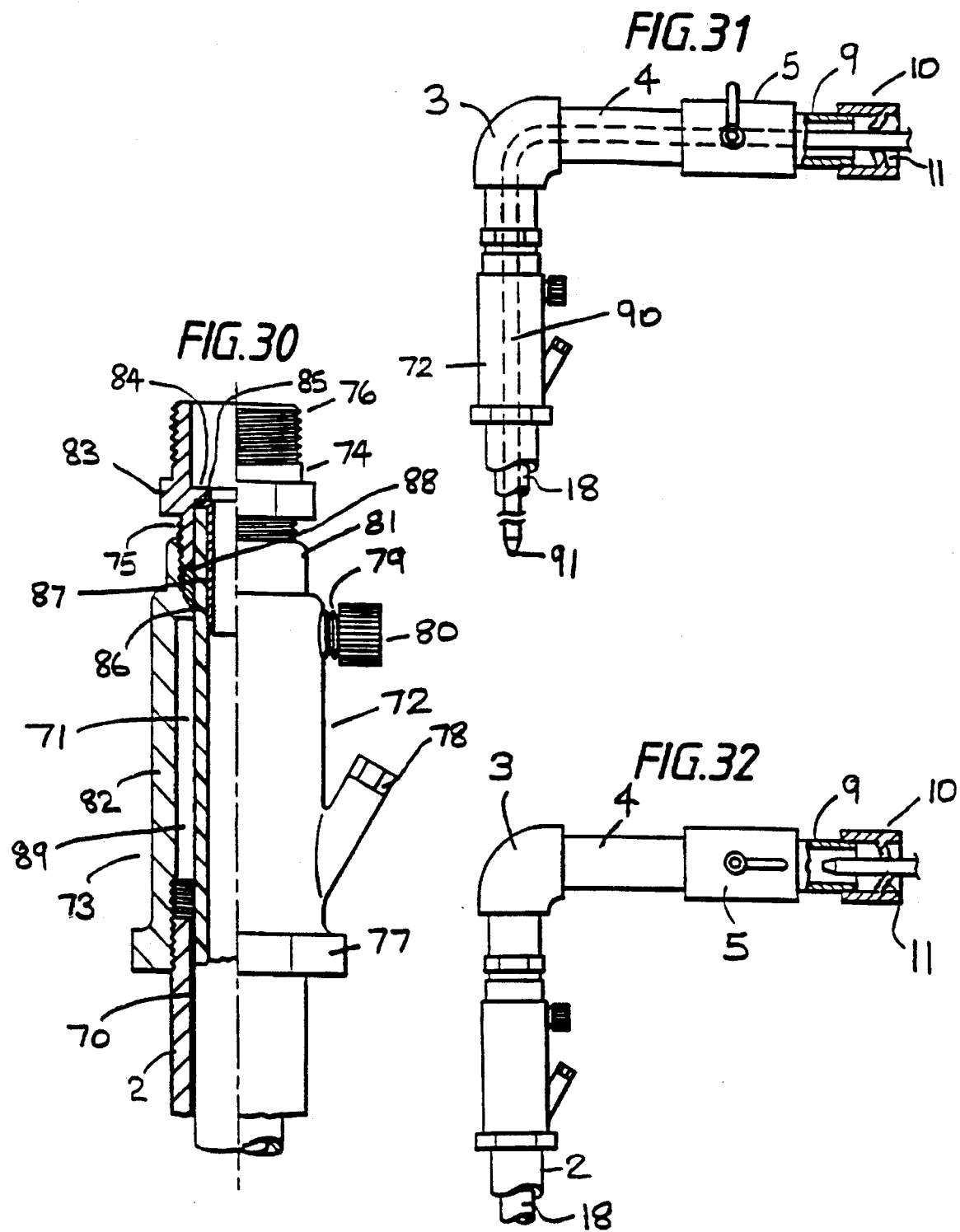

SEAL FOR ENHANCING PIPES

This application is a Divisional of application Ser. No. 07/566,411, filed Oct. 23, 1990, which was filed as International Application No. PCT/GB89/01535 on Dec. 22, 1989.

BACKGROUND OF THE INVENTION

1. Field of the Invention

The invention relates to a method for enhancing pipes, particularly service pipes for example by restoring to non-leak capability an existing service pipe without removing same.

The invention also relates to a seal for use in replacing an existing pipe carrying fluid.

2. Discussion of the Background

Service pipes are often used to connect a main supply of say a fluid such as gas to a property such as for example, a domestic dwelling. Sometimes these existing service pipes begin to leak or otherwise become in need of repair. Since these existing service pipes are often underground, it can be a costly, time-consuming and environmentally objectionable operation to locate the pipe, excavate around it and effect the necessary repairs. Moreover as the work is carried out externally of the pipe, it is generally necessary to cut off supply at the mains, which can mean that a series of dwellings can be inconvenienced as one main may supply existing service pipes leading to several dwellings. Moreover excavation can inconvenience the general public as excavation might well have to take place outside the boundary of the property affected by the need to repair/renovate the particular existing service pipe. Moreover, the occupier of the affected dwelling can be doubly inconvenienced in that apart from external disturbance, he or she has to suffer additional disturbance inside the dwelling when any replacement service pipe is connected to any meter in the dwelling.

SUMMARY OF THE INVENTION

It is accordingly an object of the invention to seek to mitigate these disadvantages.

According to one aspect of the invention there is provided a method for replacing an existing service pipe carrying fluid to an outlet within a property with a replacement fluid service pipe, the method comprising disconnecting within the property the outlet from the existing service pipe in such a way that both during and after disconnection fluid is prevented from escaping into the property, feeding into the existing service pipe a desired length of a replacement pipe in such a way that during and after the feeding step fluid is prevented from escaping into the property, connecting the outlet to the outlet end of the replacement pipe in such a way that, during the connection fluid is prevented from escaping into the property and after the connection fluid is allowed to pass to the outlet solely by way of the replacement pipe.

According to a second aspect of the invention there is provided an obturating or blocking device for obturating a pipe whereby to cut off fluid flow along the pipe, comprising a flexible tube having an inflatable obturating part which can be inflated to obturate the interior of the pipe against fluid flow.

According to a third aspect of the present invention there is provided a seal for use in replacing an existing fluid-carrying pipe with a replacement pipe, the seal comprising a tubular body of a flexible material, the body having a rear portion for connection to the leading end of the replacement pipe and a front portion adapted in use to provide a barrier to the flow of fluid along the annular gap between the internal wall of the existing pipe and the external wall of the replacement pipe, the seal also having a membrane serving to prevent the flow of fluid through the bore of the seal, the membrane being puncturable or detachable to permit the flow Of fluid through the seal.

BRIEF DESCRIPTION OF THE DRAWINGS

Various other objects, features and attendant advantages of the present invention will be more fully appreciated as the same becomes better understood from the following detailed description when considered in connection with the accompanying drawings in which like reference characters designate like or corresponding parts throughout the several views and wherein:

FIG. 8 is a partially sectional view of a fifth step according to this version of the method;

FIG. 9 is a partially sectional view of a sixth step according to this version of the method;

FIGS. 10 to 18 show sequentially yet further steps in this version of the method, some Figures being partly in cross-section, of the installation of the replacement service pipe by this version of the method;

FIG. 19 is a side view of one form of a seal to be used with a replacement service pipe in another particular version of the method;

FIG. 20 is a front view of the seal shown in FIG. 19;

FIG. 21 is a sectional view along lines XXI—XXI of FIG. 20 taken from above and to one side of the seal;

FIG. 22 shows the seal after attachment to the leading end of a replacement gas service pipe and about to be inserted into one end of the existing gas service pipe;

FIG. 23 shows a side view in section of a seal with the membrane at the rear end of the seal;

FIG. 24 shows a side view of another form of the seal, and

FIGS. 25 to 34 show sequentially the steps in the other version of the method, some Figures being partially in cross-section.

DESCRIPTION OF THE PREFERRED EMBODIMENTS

Figure 1:
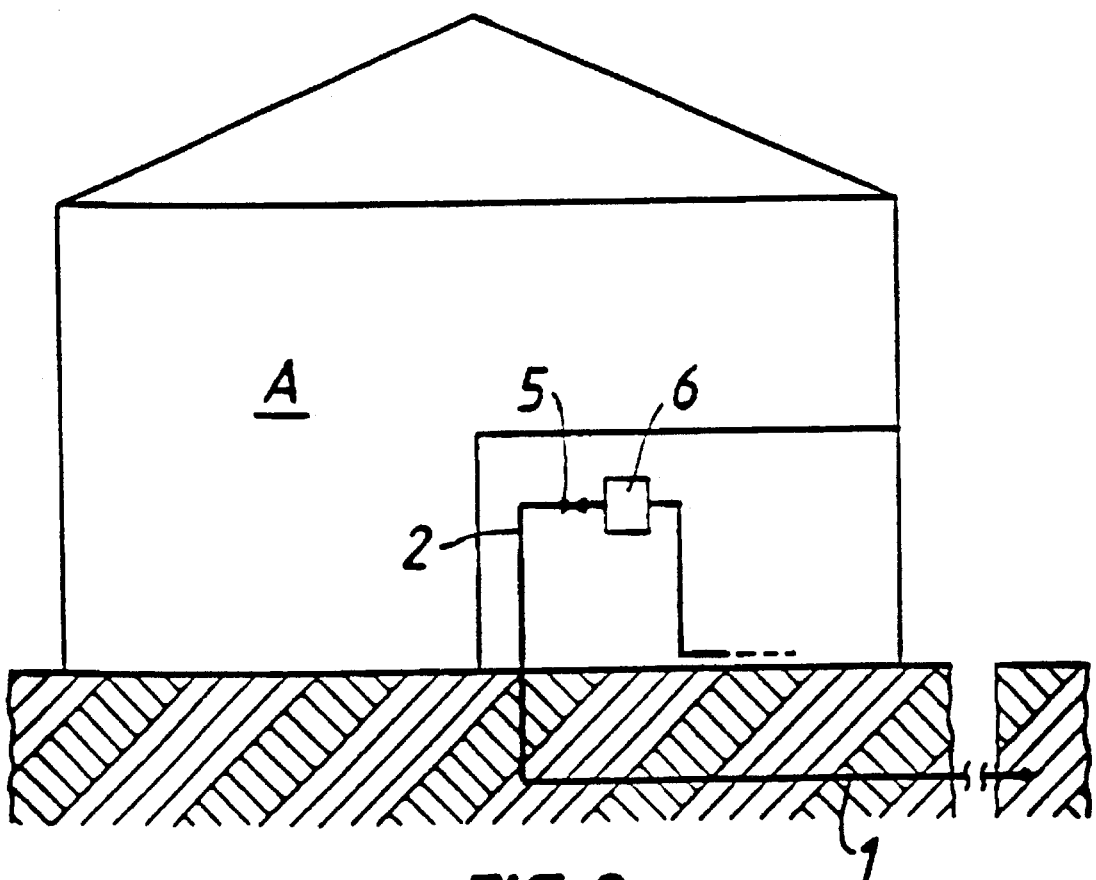
FIG. 1 is a schematic view of a property to be fitted with a replacement service pipe using the method according to the invention.
Figure 2:
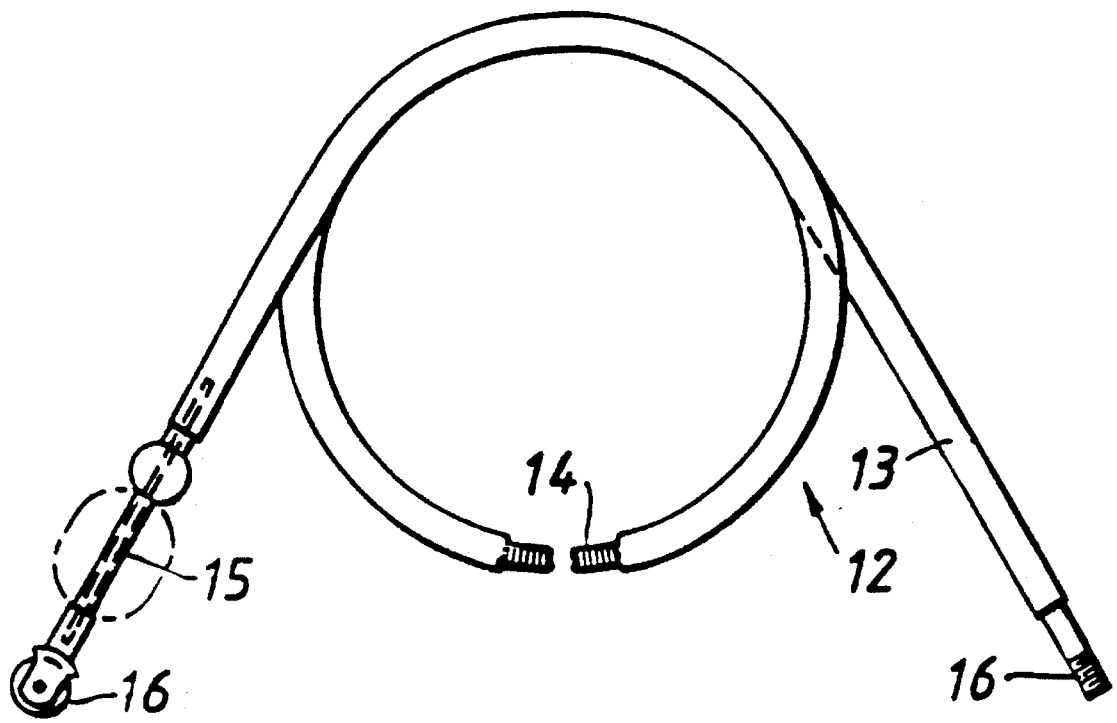
FIG. 2 is a plan view of an obturating device for use in the method according to the invention, one operating mode being shown in full lines and a second in dashed lines.

Referring to FIGS. 1 to 8, there is shown a method for replacing an existing service pipe inlet 1 carrying fluid such as gas to an outlet within a property such as a domestic dwelling "A", FIG. 1, with a replacement service pipe for the fluid. The existing service pipe 1 has an inlet 2 connected with a main supply which supplies a service such as, in the embodiment, gas, into the dwelling "A". The existing service pipe inlet 2 is connected via an elbow 3, riser 4, meter valve 5, gas meter 6 to an outlet pipe 7 in the dwelling, the meter 6 in the embodiment being positioned internally of the dwelling "A", usually adjacent a boundary wall where the riser 4 enters the dwelling.

The pipe 7 is connected with the meter outlet by a further elbow 8.

Figure 3:
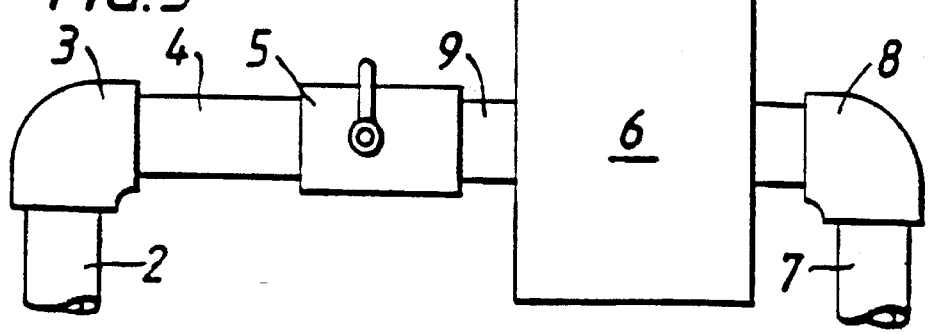
FIG. 3 is an enlarged side elevational view of a pipe/metering system used in FIG. 1.
Figure 4:
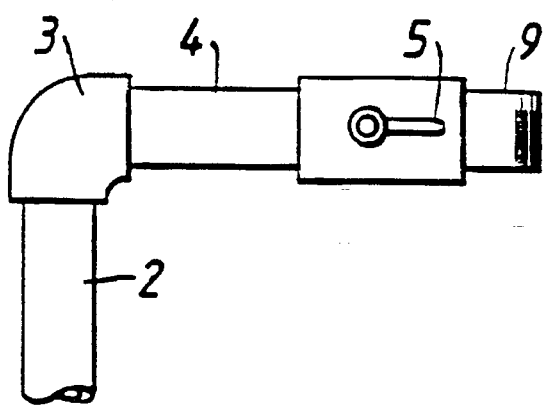
FIG. 4 is a side elevational view of a first step in the method of replacing an existing service pipe in the system of FIG. 3.
Figure 5:
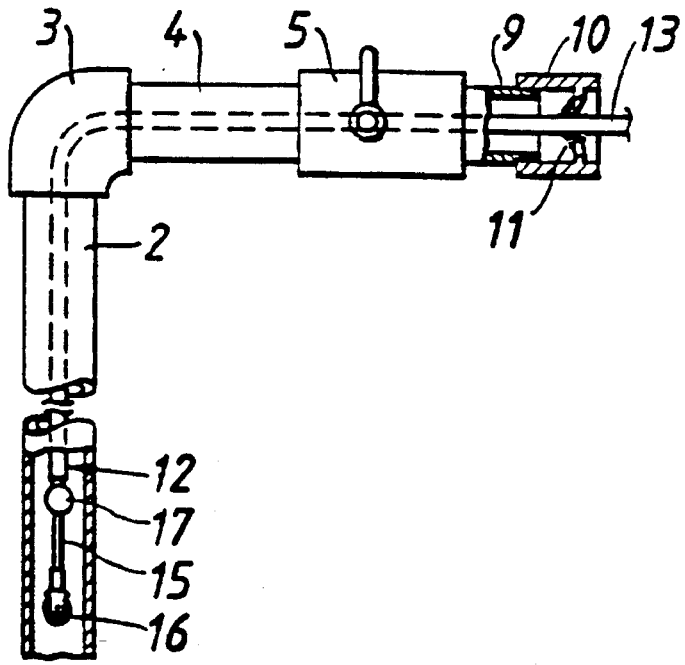
FIG. 5 is a schematic view, partly in section of a second step in the method.

In order to replace the existing service pipe 2 carrying gas to the outlet pipe 6 within the property with a replacement gas service pipe, the gas meter 6 is closed to the flow of gas by turning the meter valve 5 from the "on or open" to the "off or closed" positions (respectively shown in FIGS. 3 and 4). The meter 6 is then disconnected from the meter valve 5 by unscrewing the meter inlet from the valve outlet pipe 9. A known type gland 10, which has one or more internal annular wall or seal 11, is then connected to the valve outlet 9, the gland 10 being mounted on an internal obturating or bore blocking device 12 (FIG. 2) which is inserted into the gland 10 (FIG. 5).

One particular form of device will now be described but it will be appreciated that other conventional types of obturating devices can be used with the method.

The internal obturating device 12 comprises a flexible tube 13 made from a suitable material such as pvc lined with a resilient lining such as an elongate steel coil spring 14 whereby the device 12 may be drawn round bends without collapsing or kinking of the tube 13. Adjacent the in use leading end of the device 12 there is an inflatable part in the form of an inflatable rubber bag 15 which is inflated on passage of fluid such as air passed down the tube 13 through a non-return valve from a source (not shown) of air under pressure to which the device is connected by a connector. There is internally of the tube 13 and extending from the upstream to the downsteam side of the bag 15 an elongate flexible element which in use prevents the bag 15 from folding over when deflated.

The device 12 also has a rotatable member such as a nylon ball 16 mounted on a pivot and positioned adjacent, or in the embodiment illustrated, at the leading or downstream end of the device 12, as considered in use. The ball 16 guides the device 12 as the tube 13 is pushed into the existing service pipe inlet 2 through the valve 5 after the valve 5 has been opened, as shown in FIG. 5. There is a further member 17 in the form of a nylon ball upstream of bag 15, which ball 17 serves to prevent snagging of the device 12 on internal obstructions such as corners in the pipe 2. In use, the device 12 is fed through the valve 5 when the valve is open with the ball 16 leading until it reaches a desired position in the existing service pipe 2 as shown by the length of tube 13 fed in and the bag 15 is inflated so that it temporarily but completely blocks the interior cross-section of the existing service pipe 2 by impinging for 360° on the internal surface thereof.

Figure 6:
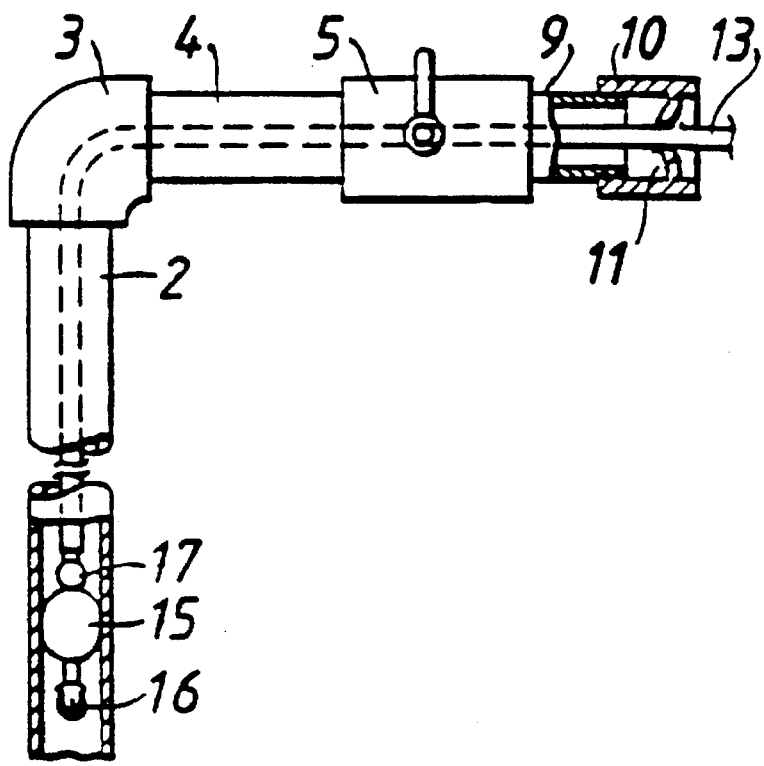
FIG. 6 is a schematic view, partly in section of a third step in the method.

The annular seal of the gland 10 which may be of rubber or similar flexible material is defined by a wall 11 surrounding an aperture which wall engages with the outer surface of the flexible tube 13 of the obturating device 12 in use so as to obstruct gas flow along the annulus formed between the inner wall of the existing service pipe 2 and the outer wall of the flexible tube 13. The gland seal 11 in use seals against the outer wall of a replacement or auxiliary service pipe 18 (FIG. 9) to obstruct gas flow along the annulus formed between the inner wall of the existing service pipe 2 and the outer wall of the auxiliary service pipe 18. The gland 10 is also of the type which prevents the escape of gas when there is nothing inserted into the gland i.e. the gland seal or seals are arranged so as at rest to seal off the end of the existing service pipe. Reverting now to the sequence of operations of the method, the obturating device 12 having been inserted and its bag 15 inflated as shown in FIG. 6, the gland 10, gas meter valve 5, elbow 3 and riser 4 are removed from the existing service pipe 2.

Thus it is not necessary to effect the removal of these items by turning off the gas supply at the main.

Figure 7:
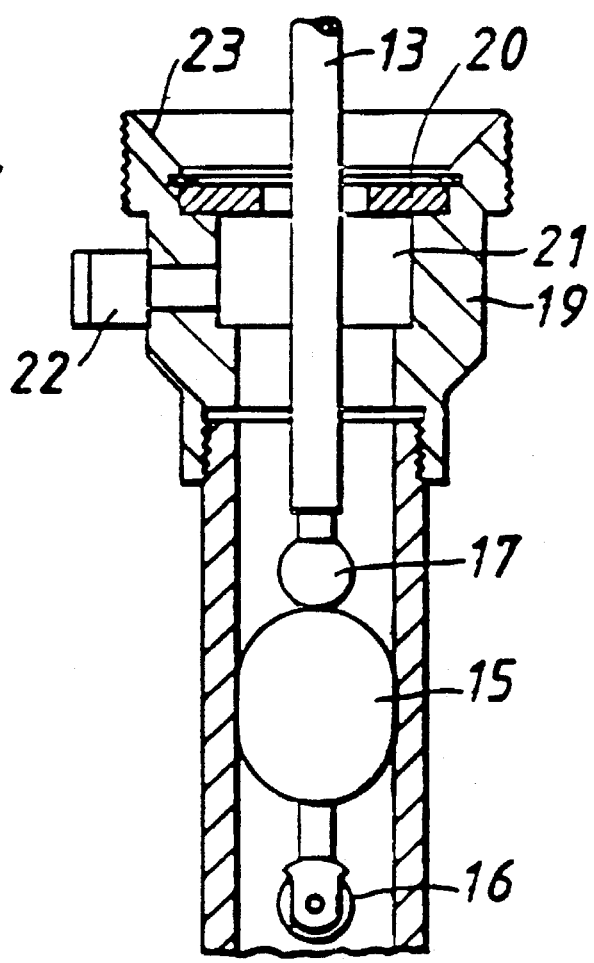
FIG. 7 is an enlarged section view of a fourth step applicable to one particular version Of the method.

In one manner of carrying out the method a half coupling 19 is then passed over the tube 13 and connected as by screwing to the free end of the existing service pipe 2 (FIG. 7). The half coupling 19 has an internal annular seal 20 which has an aperture surrounded by a wall which engages with the outer wall of the replacement service pipe 18 so as to obstruct gas flow along the annulus formed between the inner wall Of the existing service pipe 2 and the outer wall of the replacement service pipe 18.

The half coupling 19 also has a through bore 21 which is stepped to provide a seating for the annular seal 20, there being an entry in the form of an injection nozzle 22 into the bore 21. The half coupling 19 has a flared or frusto-conical entry or mouth 23.

An open full bore valve 24 is then connected with the half coupling 19 by passing the valve over the tube 13. A gland 25 is then connected to the open full bore valve 24 by passing the gland over the tube 13 (FIG. 8).

A removable internal seal 25 (FIG. 9) in the form of a rubber stopper device on the end of cable 26 is then inserted with a push into the replacement service pipe 18, which is a polyethylene tube, trimmed to the required length. The internal seal acts to seal off the bore of the replacement service pipe 18.

The bag 15 of the obturating device 12 is now deflated, and the tube 13 of the obturating device 12 is then pulled into the gland 25 (via the half coupling 9 and the full bore valve 24). The full bore valve 24 is then closed, and the obturating device 12 is pulled out of the gland 25 by its tube 13. The replacement service pipe 18 is then inserted into the gland 25 and the full bore valve 24 is then opened, allowing insertion of the replacement service pipe 18 into the half coupling 19 and then into the interior of the existing service pipe 2 (FIG. 10). The gland 25 is then disconnected from the full bore valve 24 and removed by drawing it over the replacement service pipe 18.

The full bore valve 24 in turn then disconnected from the half coupling 19 and removed by passing over the replacement service pipe 18 (upwardly as viewed in FIG. 10) to provide the situation shown in FIG. 11 with the internal annular seal 20 of the half coupling 19 bearing tightly on the exterior surface of the replacement service pipe 18 to prevent the escape of gas to the dwelling externally of the replacement service pipe 18. Gas is prevented from escaping to the dwelling "A" internally of the replacement service pipe 18 by the rubber stopper device 25.

Figure 12:
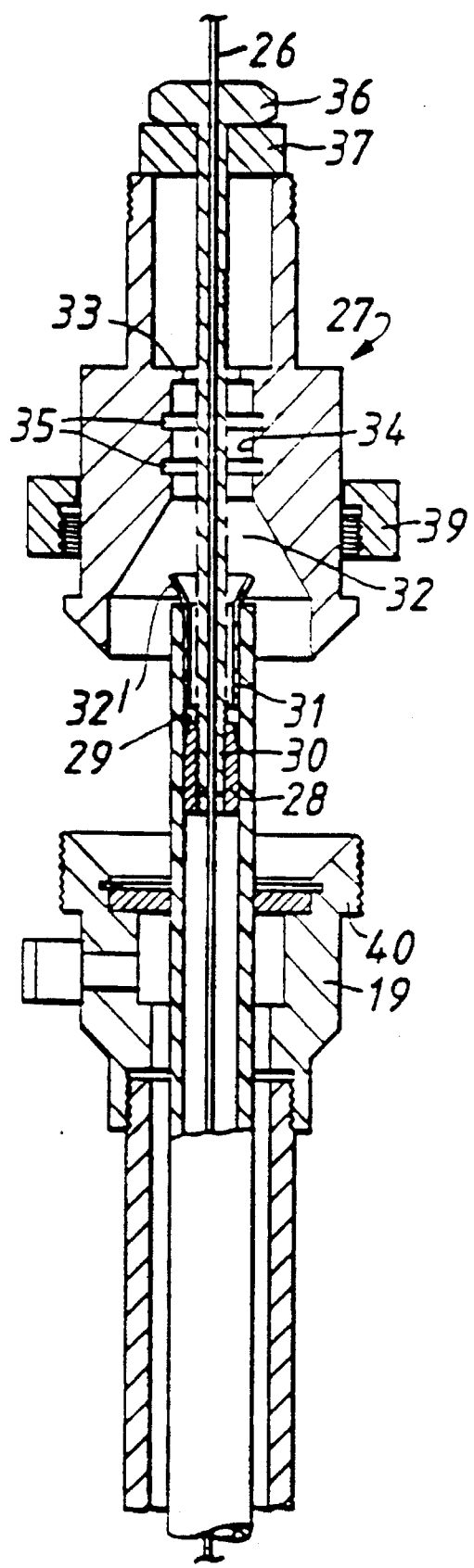
Figure 13:
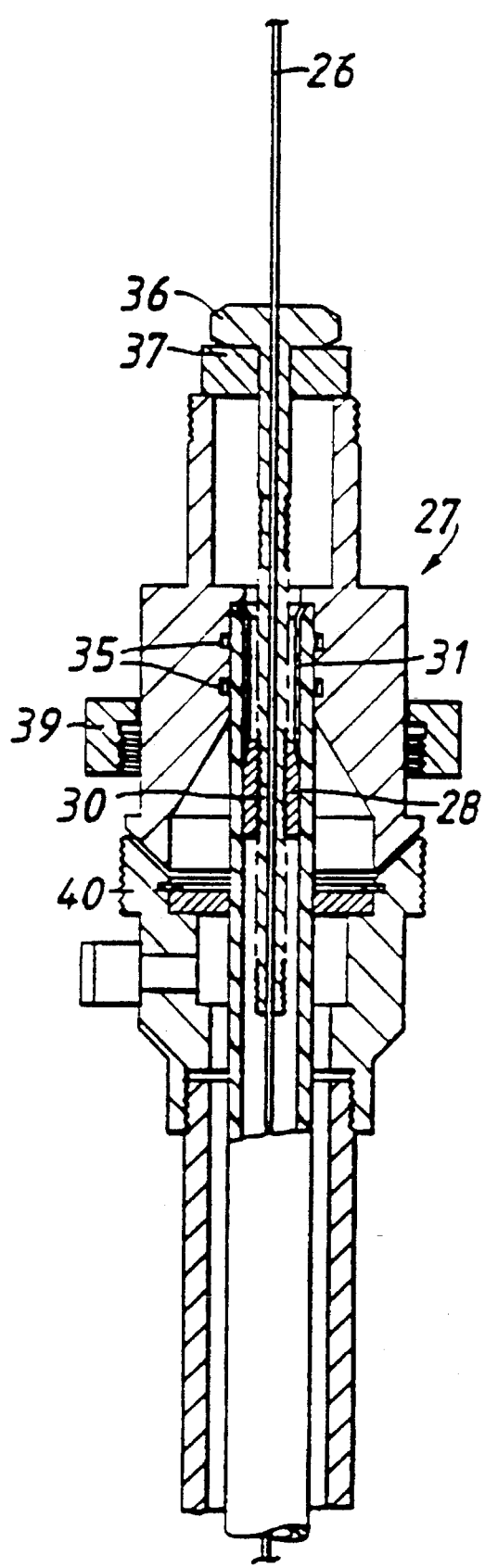

A pipe crimping coupling 27 is then connected to the half coupling 19 by passing it over the replacement service pipe 18 and cable 26 of the internal seal (downwardly as viewed in FIGS. 12 and 13).

The pipe crimping coupling 27 comprises a cylindrical threaded member 28 with a tapered or frusto-conical nose 29 which is threaded on an elongate externally threaded carrier 30 or draw means on which is also mounted an expansible malleable member in the form of a copper tube 31 which has an initially flared end 32 remote from an end which is adjacent the conical end 29 of the threaded member 28. The external diameters of the cylindrical parts of the member 28 and the copper tube 31 are such that they just fit into the bore of the replacement service pipe 18. The carrier 30 is inserted in the open end of the replacement service pipe 18 after threading over the rod 26. The bore 12 of the pipe crimping device 27 at a position remote from a flared end has an annular flange of shoulder 33. The bore 32 also has a cylindrical portion 34 between the shoulder 33 and the outwardly flared part of the bore 32. The cylindrical portion 34 of the bore 32 has pipe securing means in the form of two parallel radial grooves 35 forming a crimping surface. The pipe crimping device 27 is moved towards the half coupling 19 until the flared end of the pipe crimping device 27 fits into the flared mouth or entry 23 of the half coupling in which position the flared end 32' of the copper tube 31 abuts against annular flange 33. The carrier 30 is then rotated by a knurled integral knob 36 which bears against a washer 37. As the carrier 30 is captive, such rotation draws the member 28 inwardly (as viewed in FIGS. 12 and 13). The action draws the conical nose 29 of the cylindrical threaded member 28 into the cylindrical part of the copper tube 31, which is trapped against the annular flange 33. Therefore, on continued rotation of the carrier 30 the member 28 is drawn further into the copper tube 31 which is expanded radially, and effectively "flattened" so that it becomes wholly cylindrical. This action can only be accommodated by the radially adjacent part of the replacement service pipe 18 being forced onto the crimping surface 35 with the copper tube 31 becoming embedded in the polyethylene to an extent such that copper tube 31 digs into the polyethylene so that the service pipe 18 and copper tube 31 have substantially the same internal diameter. The carrier 30 is then rotated further to draw the member 28 right through the copper tube 31, when the carrier 30 is simply removed with the member 28 by withdrawing over the rod 26. The copper tube 31 remains firmly in place wedged in the replacement service pipe 18, which is itself firmly crimped to the crimping-surface 35. The half coupling 19 and pipe crimping coupling 27 are then firmly made up into a complete coupling 38 by screwing a knurled nut 30 down (as viewed in FIG. 14) over external threads of a complementary part 40 of the half coupling 19, so securing the complete coupling with the replacement service pipe 18 in place (FIG. 14). The half coupling 19 and pipe crimper 27 thus comprise respective first and further coupling elements or parts of the complete coupling 38.

Figure 17:
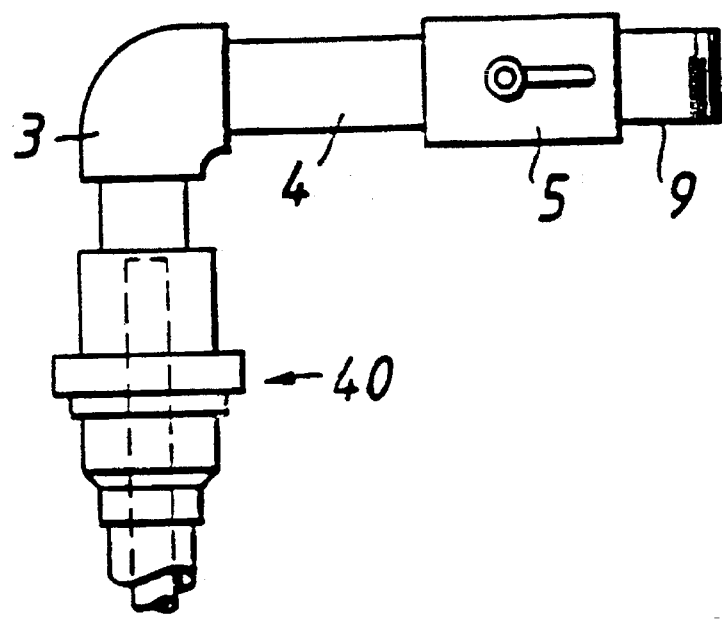
Figure 18:
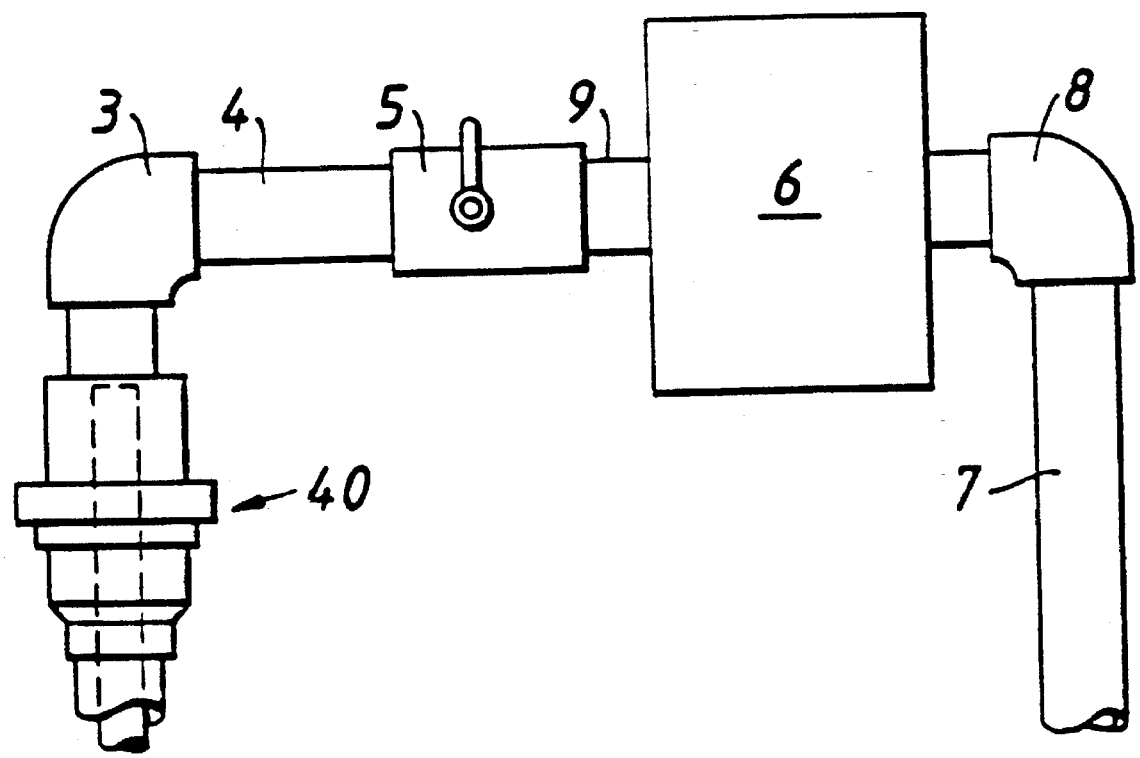
Figure 25:
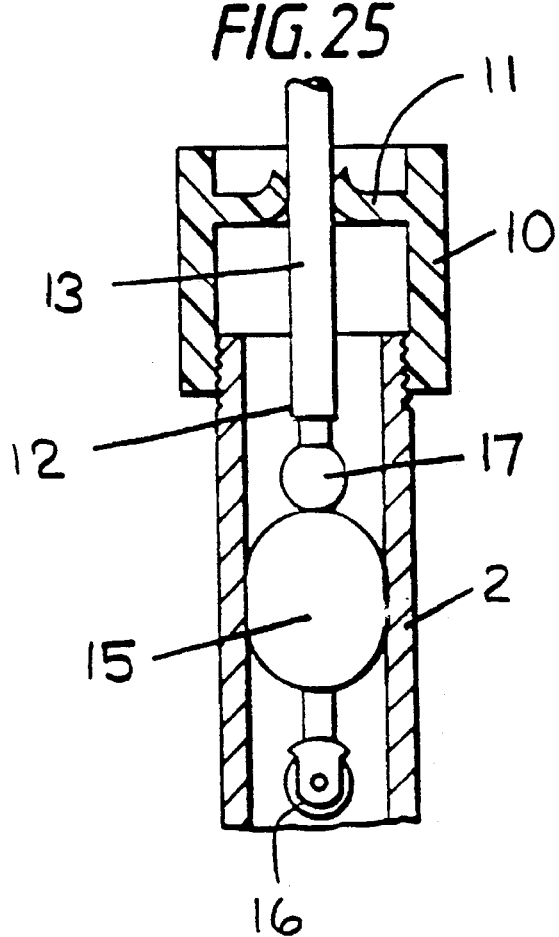

The elbow 3 is then connected to the completed pipe coupling 38 and the riser 4 is connected to the elbow 3. The valve 5, which is open, is then connected to the riser 4, and a gland 41 is connected to the valve outlet 9 as by screwing. The further gland 41 forms a seal with the cable 26 of the internal seal 25 so preventing passage of gas into the dwelling "A". The internal seal 25 is then withdrawn through the replacement service pipe 18 and valve 5 into the further gland 41, and the valve 5 is closed (FIG. 16). The further gland 41 is then removed from the valve outlet 9 with the internal seal, by unscrewing the further gland 41 from the outlet 9 of the valve 5 (FIG. 17). The valve outlet 9 is reconnected to the inlet of the gas meter 6 and the gas meter valve 5 is then returned to the open position (FIG. 18).

A flowable settable sealant such as a mastic may be injected through the nozzle 22 entry of the half coupling 19 to fill an annular space round the replacement service pipe 18.

Referring to FIGS. 19 to 21 the seal 50 for use in another version of the method, may be a molding of a synthetic resin material such as polyethylene, and comprises a tubular body 51 having a rear portion 52 for insertion into the leading end of the replacement gas service pipe 18 and a front portion 54.

The rear portion 52 is provided with several circumferentially arranged tooth-like elements 55 serving to engage and grip the internal wall of the replacement pipe 18 when the portion 52 is push-fitted into the leading end of that pipe. The external diameter of the portion 52 is so selected that, in use, the portion 52 forms a gas-tight fit with the internal wall of the replacement pipe 22 as shown in FIG. 22. In use, however the outer surface of the rear portion 52 may be coated with a suitable settable adhesive so that the portion 52 adheres firmly to the internal wall of the replacement pipe 18 upon insertion thereinto. The replacement pipe 18 itself is also made of a synthetic resin material preferably polyethylene, so allowing the seal to be heat fused onto the replacement pipe 18 as an alternative to adhesive.

The front portion 54 comprises several spaced continuous circumferential annular vanes 56 to 60 which are generally radially directed and disposed at a spacing from each other along the outer wall of the seal. As shown the diameter of the vanes increases in the direction from the front end of the seal to the point at which the rear portion 52 of the seal begins. The rearmost vane 60 forms an abuttment for the circumferential front edge of the replacement pipe 18 as shown in FIG. 22. In use, one or more and preferably all the vanes are so dimensioned as to provide a barrier to the flow of gas along any annular gap which would, in use, upon insertion of the seal be formed between the body 52 of the seal and the internal wall of the existing gas service pipe.

The seal is also provided at its front end with a membrane 62 closing off the bore of the seal body 52, wherein in use to prevent the flow of gas into and through the body 52 of the seal until the membrane 62 is punctured, detached or broken in some way.

In the embodiment shown in FIG. 23 the membrane 62 is located at the rear end of the seal. Otherwise the seal is similar in form to that previously described.

In the embodiment shown in FIG. 24, the front portion 54 of the seal has a thicker wall 63 than that shown in FIGS. 19 to 23 so that there is formed between the front and rear portions an annular shoulder 64 rearwardly of the last of the vanes 60. Because of this the radial extent of the vanes 56 to 60 in the seal in FIG. 24 is foreshortened in comparison to the radial extent of the vanes in the seal in FIGS. 19 to 23 so that the overall radial dimension of area bounded by each vane remains unchanged.

In addition extending radially through the wall of the front portion 54 of the seal at a point disposed between the last vane 60 and the shoulder 64 is an aperture 65 for purposes to be described subsequently.

In use, as shown the front end of the replacement service pipe 18 is caused to abut against the shoulder 64. After the rear portion 52 of the seal has been push fitted onto the end of the service pipe 18, the seal is heat fused thereto or is affixed thereto by adhesive.

Referring now to FIGS. 25 to 34 in this version of the method the first six steps in the method are identical to those previously described with reference to FIGS. 1 to 6 which steps are therefore common to both versions of the method as are the components shown in these Figures. However, in the next step in the second version of the method (FIG. 25) the gland 10 is passed back over the tube 13 of the obturating device 12 and is connected to the threaded end of the existing service pipe 2 as shown in the Figure.

Figure 26:
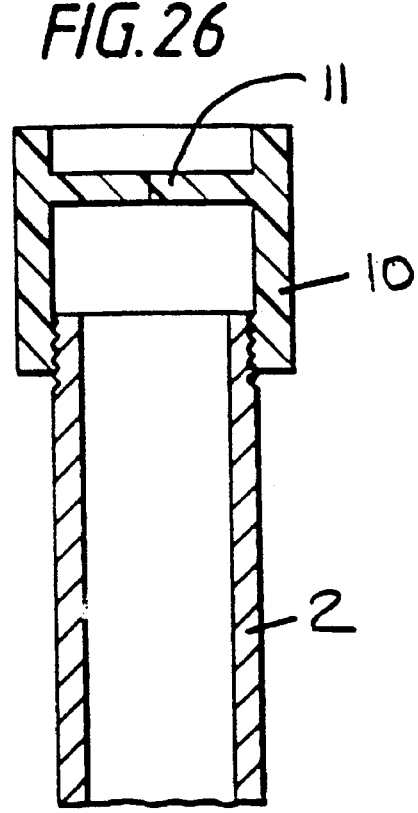

The bag 15 of the obturating device 12 is now deflated and the tube 13 of the device 12 is pulled into and out of the gland 10 (FIG. 26). The gland seal 11 is now closed to shut the aperture and prevent the escape of gas from the existing service pipe 2.

Figure 27:
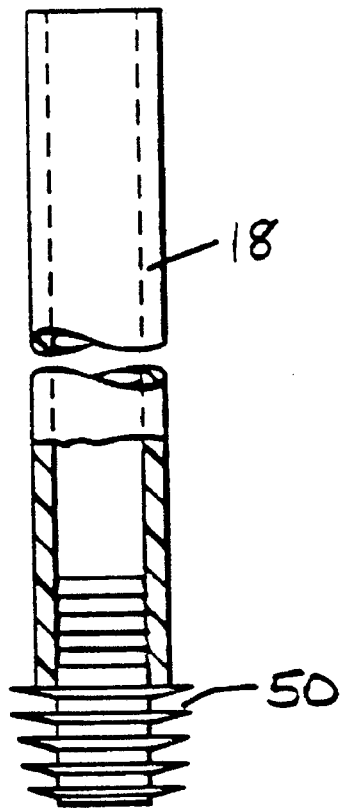

In the next step in this version of the method one of the types of seal 50 shown in FIGS. 19 to 24 is fitted to the leading end of the replacement pipe 18 as shown in FIG. 27. In this Figure the seal is similar to that shown in FIG. 19 but it is preferred to use one similar to that shown in FIG. 24. The seal 50 is preferably heat fused to the leading end of the replacement pipe 18 but it could be affixed thereto by an adhesive if preferred.

Figure 28:
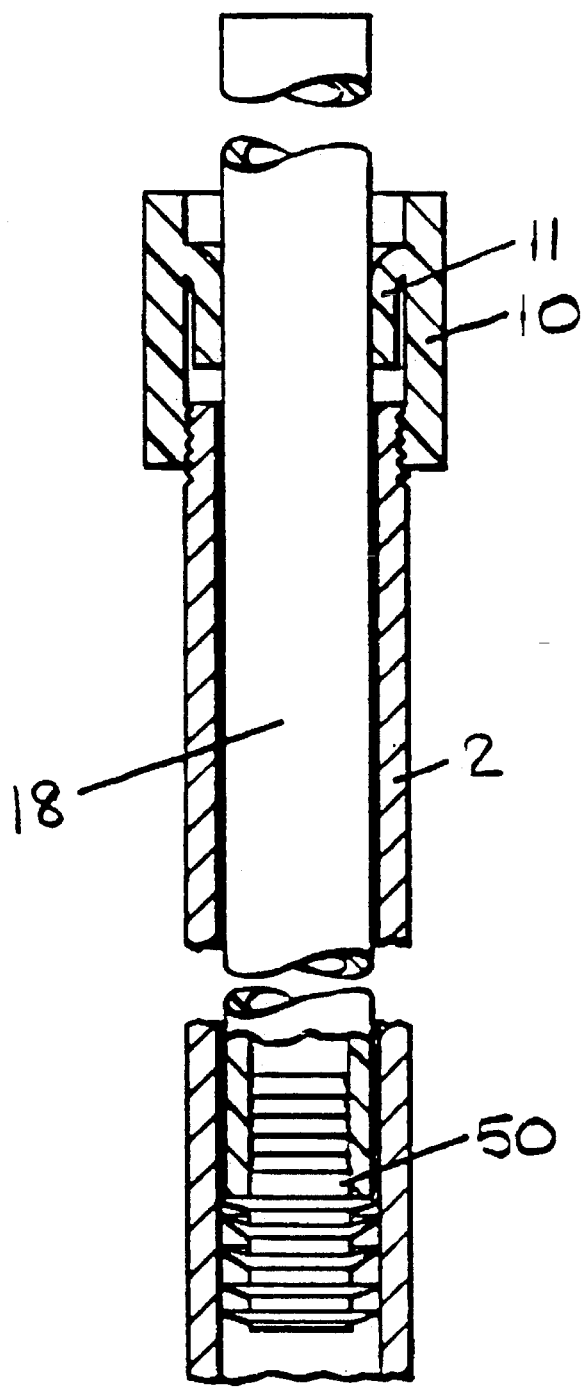

The replacement pipe 18 with the seal 50 at its leading end is then inserted into the gland 10 and is pushed through the existing service pipe 2 as far as required (FIG. 28). One or more of the vanes of the seal 50 engage with the inner wall of the existing surface pipe 2 so as to provide a barrier to the flow of gas in the direction of the gland 10 along any annular gap which is, in use, upon insertion of the replacement pipe 18 formed between the external wall of the replacement pipe 18 and the internal wall of the existing service pipe 2. In addition the seal membrane prevents the flow of gas into and through the body 52 of the seal 50 and thence into the replacement pipe 18. The replacement pipe can be pushed in until it contacts a service tee, elbow or bend at the main (not shown). Alternatively the replacement pipe can be pushed until it contacts a fitting such as a polyethylene to steel transition fitting if present in the existing service pipe.

Figure 29:
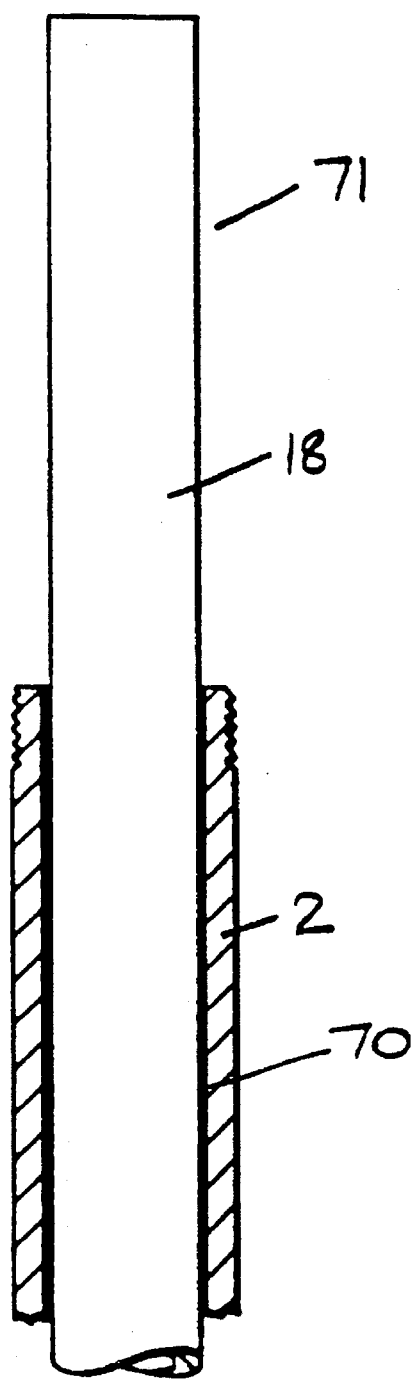

In the next stage of the method, the gland 10 is disconnected from the end of existing service pipe 10 and the gland 10 is removed from the replacement pipe 18 by passing the gland 10 over it so that position shown in FIG. 29 is reached. In this position the vanes on the seal and its membrane respectively prevent gas from passing into the space 70 between the existing and replacement service pipes and into and along the bore of the replacement service pipe 18.

The replacement service pipe 18 is then cut to length in such a way that a portion 71 of it (FIG. 29) is left protruding from the end of the existing service pipe 2.

In the next stage, both the existing service pipe 2 and the replacement service pipe 18 are connected to a component known as a service head adaptor, one version 72 of which is shown in half-section in FIG. 30.

The service head adaptor is a two part component having a first or, in FIG. 30 lowermost bell shaped body 73 for connection to the threaded end of the existing service pipe 2 and a second or in FIG. 30, an uppermost cylindrical head 74 for connection at a lower end 75 to the adaptor body 73 and at an upper end 76 to the elbow 3 in a subsequent stage of the method.

The body 73 terminates in a flared lowermost end, the outer surface of which has flats 77 in an hexagonal formation for engagement with a spanner to screw the body 73 on to the existing service pipe 2. As will be seen the inner surface of the lowermost end is threaded for engagement with the threads on the outermost surface of the existing service pipe 2.

Extending upwardly and at an angle from the wall of the adaptor body 73 is an injection nipple 78 for injecting a sealant into the body 73 and thence into the annular space 70 between the replacement and existing service pipes in the manner previously described in the description of the first verion of the method.

Located above the nipple 78 and extending radially outwardly from the adaptor body 73 is a pressure vent stub pipe 79 which is externally threaded to receive a cap 80 which normally closes off the vent 79.

The body 73 terminates in an uppermost portion 81 of reduced diameter compared to the lower portion 82 of the body 73, the uppermost portion 81 having an internally threaded surface for engaging with the externally threaded surface of the lower end 75 of the adaptor head 74. As will be seen the upper end 76 of adaptor head 74 is also externally threaded for engaging with the elbow 3, as will be described subsequently. In addition the ends 75, 76 of adaptor head 74 are separated by a hexagonal shoulder 83 for engagement by a spanner to enable the head to be screwed into the body 73.

The head 74 is provided internally with a radially inwardly projecting annular rib 84 at a position opposite to the shoulder 83, which rib 84, in use, the uppermost end of the replacement pipe 18 abuts via the flanged end 85 of a tubular copper insert 86. The tubular portion 87 of the insert is dimensioned to be a push fit within the bore of the replacement pipe 18 whereby the flanged end 85 of the insert is seated over the uppermost end face of the replacement pipe 18.

When engaged with the adaptor body 73 in the manner shown in FIG. 30, the head 74 forms internally therewith an annular recess serving to received an annular sealing olive 88 of a suitable flexible material such as rubber. With the olive 88 in place screwing the head 74 into the body 73 causes the olive 88 to be compressed against the outer wall of the replacement pipe 18. This is prevented from flexing inwards by the tubular wall 87 of the insert 86. Thus there is formed between the adaptor 72 and the replacement pipe 18 a gas-tight seal.

In use of the adaptor 72, first of all the body 73 is lowered over the portion 71 of the replacement pipe 18 and is then screwed onto the end of existing service pipe 2. It will be noted from FIG. 30 that the adaptor body 73 is shaped to form with the replacement pipe 18 an annular chamber 89 acting as a reservoir to receive grout or sealing compound injected through the nipple 78 as will be subsequently described. Next, the sealing olive 88 is positioned within the part of the recess formed by the adaptor body 73. Then the tubular copper insert 86 is push-fitted into the end of the replacement pipe 18 until the flanged end 85 engages with the end face of the replacement pipe. Finally, the lower end 75 of the adaptor head 74 is located over the projecting end of the replacement pipe 18, there being a close fit between the internal wall of the end 74 and the external wall of the replacement pipe 18, as shown in FIG. 30, and the head 74 is screwed into the adaptor body 73 until the rib 84 engages tightly with the flanged end 85 of the insert 86. At the same time the sealing olive 88 will be compressed against the wall of the replacement pipe 18 thereby providing a gas-tight seal between the adaptor and the replacement pipe.

A liquid and settable sealant, such as a cement grout, foam or anaerobic sealant is injected through the nipple 78 into the chamber 89 and thence into the annular space 70 between the replacement and existing service pipes until the space is completely fitted. Sufficient sealant is injected so as completely to fill the space 70 from the seal 50 at the leading end of the replacement service pipe 18 to the chamber 89. The vanes on the seal 50 form a barrier preventing the settable sealant passing into the main to which the existing service pipe is connected. The liquid settable sealant is now allowed to set. Preferably a seal 50 similar to that shown in FIG. 24 is used so that any gas or air trapped in the space 70 is expelled by the moving front of sealant through the aperture 65 and then along and out of the free end of the replacement pipe 18.

After the sealant has been allowed to set, the nipple aperture is plugged, the elbow 3 is screw connected to the upper end 76 of the adaptor head, the riser 4 is reconnected to the elbow 3 and the gas meter valve 5 is reconnected to the riser 4. Preferably, an unused new gland 10 is then connected to the meter valve outlet 9. Then a membrane puncturing rod or tool 90 is inserted into the gland 10. The rod 90 (see FIG. 31) is flexible and may comprise a length of steel wire sleeved in a suitable plastic such as polyethylene or pvc. The rod 90 terminates in its leading end in a point 91 which is adapted to pierce or puncture the seal membrane to permit gas to enter the replacement service pipe 18 from the existing service pipe 2. The gland 10 forms with the surface of the rod 90 a seal preventing escape of gas from the gland to atmosphere when the seal membrane is punctured. The meter valve 5 is opened and the rod 90 is pushed through the replacement pipe 18 as shown in FIG. 31 until the point 91 encounters the seal membrane. Continued pushing causes the point 91 to pierce or puncture the membrane and allows gas to enter the replacement pipe 18.

After the puncturing step, the rod 90 is withdrawn from the replacement pipe 18, through the elbow 3, riser 4 and meter valve 5 until its point 91 is located in the meter valve outlet 9 as shown in FIG. 32.

Figure 33:
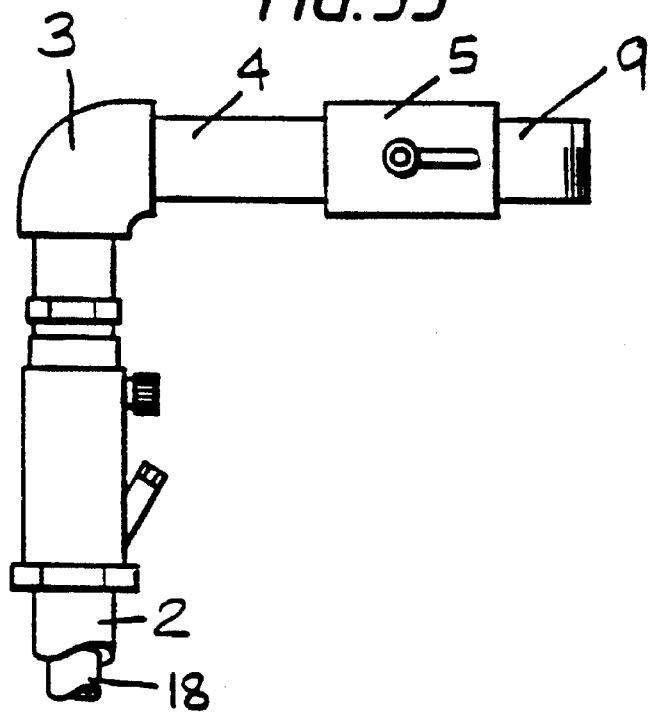

The meter valve 5 is then closed, the rod 91 is withdrawn from the gland 10 which is then disconnected from the meter valve outlet 9 so that the position shown in FIG. 33 is reached.

Figure 34:
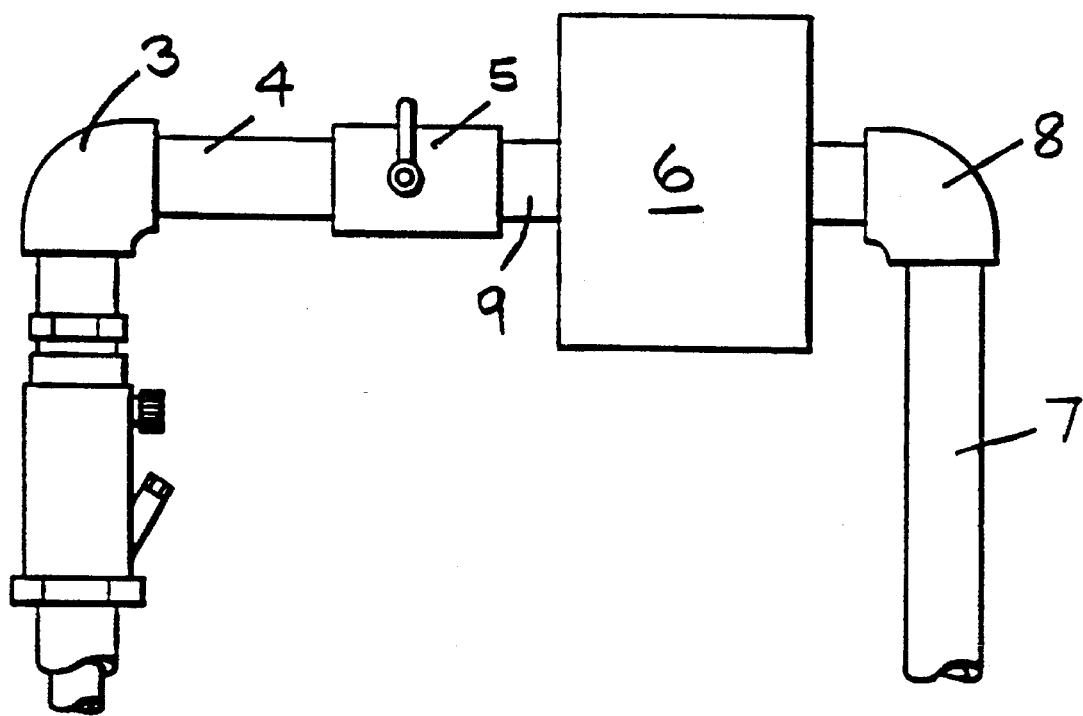

Finally, the gas meter inlet is reconnected to the meter valve outlet 9 and the meter control valve opened to supply gas to the premises (FIG. 34).

Both versions of the methods described provide for mounting a replacement service pipe in position in an existing service pipe, installation being permitted to take place within the dwelling but without having to turn the gas supply off at the mains.

It will be understood that the method, obturator and seal described herein with reference to the drawings may be used to instal a replacement service pipe in an existing service pipe carrying fluids other than domestic gas.

We claim:

1. A seal for replacing an existing fluid-carrying pipe with a replacement pipe, which comprises:
    a tubular body of a flexible material, the body having a rear portion for connection to the leading end of the replacement pipe and a front portion to provide a barrier to the flow of fluid along an annular gap between an internal wall of the existing pipe and an external wall of the replacement pipe, the seal also having a seal member preventing the flow of fluid through the bore of the seal, the seal member being one of the removable seal member and a puncturable seal member preventing the flow of fluid through the seal, wherein the front portion has a plurality of vanes, disposed around an external wall of the front portion, the vanes providing a barrier to the flow of fluid along the annular gap wherein the body includes a wall having an aperture and wherein the wall, in use, links the bore of the seal to the annular gap.

2. A seal for replacing an existing fluid-carrying pipe with a replacement pipe which forms an annular gap with the existing pipe, which comprises:
    a tubular body of a flexible material, the body having a rear portion for connection to the leading end of the replacement pipe and a front portion to provide a barrier to the flow of fluid along the annular gap between the internal wall of the existing pipe and the external wall of the replacement pipe, the seal also having a seal member serving to prevent the flow of fluid through the bore of the seal, the seal member being one of a removable seal member and a puncturable seal member to permit the flow of fluid through the seal, wherein the body has a wall having an aperture which links the bore of the seal to the annular gap.

3. A seal as claimed in claim 2, wherein the front portion has at least one annular vane disposed around an external wall thereto, the at least one vane providing the barrier to the flow of fluid along the annular gap.

4. A seal as claimed in claim 3, wherein said at least one vane comprises a plurality of vanes, the diameter of the vanes increasing in the direction from a front end of the seal to a rear end thereof.

5. A seal as claimed in claim 2, wherein the seal member is located at a front end of the seal.

6. A seal as claimed in claim 2, wherein the seal comprises polyethylene.

7. A seal as claimed in claim 2, wherein the seal comprises a molding.

8. A seal as claimed in claim 2, in which the seal member comprises a membrane.

9. A seal as claimed in claim 2, wherein said rear portion of the body is located within the leading end of the replacement pipe.

\* \* \* \* \*